United States Patent [19]

Dearden et al.

[11] Patent Number: 4,732,416
[45] Date of Patent: Mar. 22, 1988

[54] PIPE CONNECTORS

[75] Inventors: Geoffrey C. Dearden, Bedford, England; Donald N. Jones, Aberdeenshire, Scotland; Katsuo Ueno, Hertfordshire, England

[73] Assignees: Hunting Oilfield Services (UK) Limited, Aberdeen, Scotland; Kawasaki Steel Corporation, Kobe, Japan; part interest to each

[21] Appl. No.: 21,547

[22] Filed: Mar. 2, 1987

Related U.S. Application Data

[63] Continuation of Ser. No. 740,185, May 31, 1985, abandoned.

[30] Foreign Application Priority Data

Jun. 4, 1984 [GB] United Kingdom ............... 8414203

[51] Int. Cl.$^4$ ........................................... F16L 15/00
[52] U.S. Cl. .................................... 285/333; 285/383
[58] Field of Search ............... 285/333, 334, 383, 417

[56] References Cited

U.S. PATENT DOCUMENTS 2,258,066 10/1941 Oyen ................................. 285/334 X
3,359,013 12/1967 Knox et al. ....................... 285/334 X
3,572,777  3/1971 Blose et al. ........................... 285/334
3,870,351  3/1975 Matsuki .
4,085,951  4/1978 Morris ................................. 285/334
4,384,737  5/1983 Reusser ............................... 285/334
4,398,756  8/1983 Duret et al. ......................... 285/334

FOREIGN PATENT DOCUMENTS 11606    2/1983 Australia .
2134274  8/1972 Fed. Rep. of Germany ...... 285/334
6615311  5/1967 Netherlands ........................ 285/334
7510249  3/1977 Netherlands ........................ 285/334

Primary Examiner—Kenneth J. Dorner
Attorney, Agent, or Firm—Balogh, Osann, Kramer, Dvorak, Genova & Traub

[57] ABSTRACT

A pipe connector comprises an internally threaded female member and an externally threaded male member for threaded engagement in the female member. When the members are fully engaged together, an axially and radially directed surface at the free end of one of the members, e.g. the male member, is abutted against a corresponding surface on the other member, e.g. the female member. The surface comprises radially inwardly and outwardly curved surface portions which are relatively dimensioned to be a radial force fit such as to cause deflection of the end portion of the free end of the male member away from the female member as the members are brought into full engagement to bring the surfaces into full engagement.

4 Claims, 10 Drawing Figures

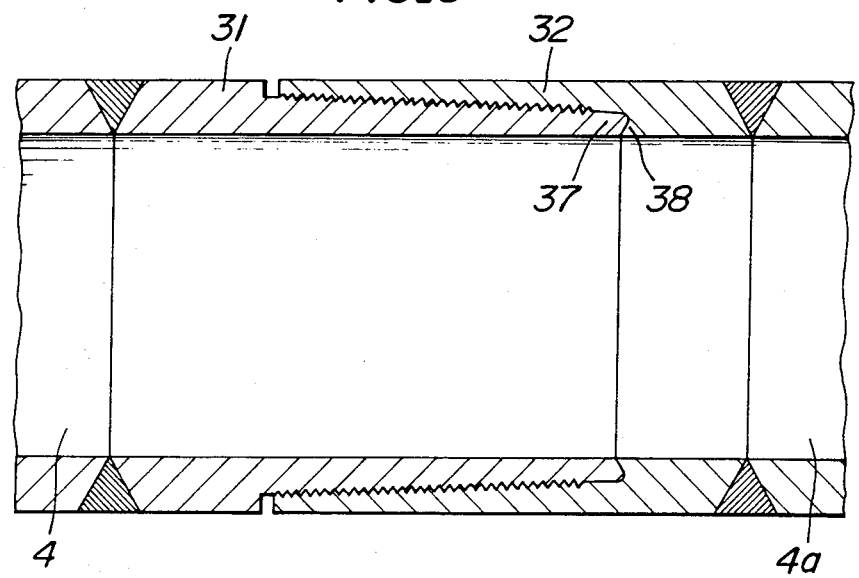
FIG_6
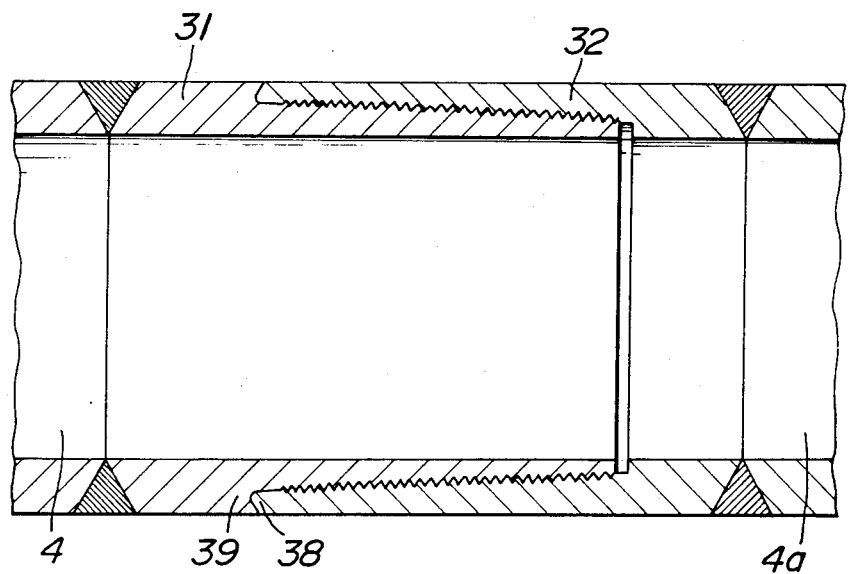
FIG_7

PIPE CONNECTORS

This is a continuation of application Ser. No. 740,185, filed May 31, 1985 and now abandoned.

BACKGROUND OF THE INVENTION

1. Field of the Invention

The present invention relates to pipe connectors for connecting pipes particularly but not exclusively for use in conveying pressurized fluids, for example steam, gas or oil, for example in oil or gas exploration or production.

2. Description of the Prior Art

One of the main types of connector presently used for such purposes comprises a female member having an internal circumferential surface provided with a thread and a male member having a corresponding external circumferential surface also provided with a thread which is threadedly received within the female member. Seals are required between the members and frequently one such seal is provided by abutment between an axially facing surface on the free end of one of the members, generally the male member, and a corresponding surface provided on the other member, the surfaces being abutted under compression when the members are fully engaged together. To obtain seals which will withstand conditions of use, the surfaces need to be abutted under triaxial compression, i.e. compressive forces in axial, radial and circumferential directions. To obtain this the abutted surfaces are directed radially as well as axially. In one connector the free end of the male member is provided with two oppositely directed frusto-conical surfaces being a radially outer surface the apex of the cone of which is directed outwardly of the male member and a radially inner surface the apex of the cone of which is directed inwardly of the member, such that the free end of the male member has a generally V-shaped section in a radial plane. Corresponding surfaces are provided on a shoulder in the female member and the two members are relatively dimensioned so that the radially inner surface on the male member comes into contact with the corresponding surface on the female member first and is then deformed to bring the radially outer surface on the male member into contact with the corresponding surface on the female member. However in this connector, when the two members are fully engaged together, a very high stress concentration may occur along the line joining the two frusto-conical surfaces of the male member and this can cause part of the shoulder of the female member extending from this line of high stress concentration to shear off, totally destroying the seal.

SUMMARY OF THE INVENTION

It is a primary object of the invention to provide improved pipe connectors which eliminate all the disadvantages of the prior art above described and which do not cause the stress concentration and are able to keep complete seal with the aid of triaxial compression.

It is a further object of the invention to provide pipe connectors which are simple in construction and inexpensive and are able to keep the seal in the connectors even if being subjected to high internal pressures and external forces.

In order to achieve these objects, the pipe connector according to the present invention comprising a female member having an internal circumferential surface provided with a thread and a male member having an external circumferential surface corresponding to the internal circumferential surface of the female member, to be received within the female member, and provided with a thread for engagement with the thread of the female member, wherein, when the members are fully engaged together, a generally axially directed annular surface at the free end of one of the members makes abutting sealing contact with a corresponding oppositely generally axially directed annular surface on the other member, the abutted surfaces of the members comprising portions which are directed radially outwardly and inwardly of the members and which are continuously curved.

Advantageously the abutted surfaces of the members are relatively dimensioned so that they are a radial force fit such as to cause deformation of the end portion of the free end of the one member away from the other member as the members are fully engaged together.

According to another aspect of the present invention there is provided a pipe connector comprising a female member having an internal circumferential surface provided with a thread and a male member to be received within the female member and having an external circumferential surface corersponding to the internal circumferential surface of the female member provided with a thread to be engaged with the thread of the female member, wherein, when the members are fully engaged together, a generally axially facing annular surface at the free end of the one of the members makes abutting sealing contact with a corresponding oppositely generally axially facing annular surface on the other member, the annular surface at the free end of the one member comprising a first radially outwardly and axially facing annular surface portion having a first radius of curvature, a second radially inwardly and axially facing annular surface portion having a second radius of curvature, and a third annular surface portion having a third radius of curvature which interconnects and merges with the first and second surface portions, the third radius of curvature being less than the first and second radii of curvature, and the other member having corresponding first, second and third annular surface portions having substantially the same radii of curvature as the first, second and third annular surface portions of the one member, the relative dimensions of the abutted surfaces being arranged so that the portion of the free end of the one member provided with the annular surface portions is a radial force fit relative to the other member such as to cause radial deformation of the end portion of the free end of the one member in a direction away from the other member as the members are fully engaged together.

Advantageously where the third surface portion merges with the first and second surface portions of the members respectively, the surface portions have common tangents.

According to one embodiment, the one member is the male member, a generally axially directed annular surface at the free end of the male member making abutted sealing contact with a corresponding oppositely generally axially directed annular surface on the female member, and the dimensions of the annular surface portions of the members are arranged so that the first surface portions come into contact and are deformed before the second surface portions come into contact.

Advantageously the surface portions are arranged so that, while the third surface portions may come into contact when the members are fully engaged together, the compressive stress thereacross is less than that across the first and second surface portions of the members.

Preferably, where the one member is the male member, the first radius of curvature of the first surface portion of the male member is less than the second radius of curvature of the second surface portion and the radius of curvature of the third surface portion is substantially less than both the first and second radii of curvature.

For example, the first radius of curvature may be about one half the second radius of curvature and the third radius of curvature may be about one tenth of the second radius of curvature.

Preferably, where the one member is the male member, the first surface portion of the male member merges with a cylindrical peripheral surface portion and the first surface portion of the female member merges with a frusto-conical surface portion, the maximum diameter of which is greater than that of the cylindrical surface portion of the male member so that the frusto-conical surface portion of the female member serves to guide the free end of the male member towards its final position relative to the female member. The minimum diameter of the frusto-conical surface portion of the female member is preferably less than that of the cylindrical surface portion.

Where the one member is the male member, the second surface portion of the male member may terminate at the internal surface of the male member or may merge with a fourth annular frusto-conical surface portion which then terminates at the internal surface of the member. In the latter event, the female member is also provided with a corresponding fourth annular surface portion having substantially the same conicity as the fourth surface portion of the male member. Advantageously the fourth frusto-conical surface portions form tangents to the second surface portions.

According to another embodiment of the invention, the one member is the female member, a generally axially directed surface at the free end of the female member making abutted sealing contact with a corresponding oppositely generally axially directed annular surface on the male member, and the dimensions of the annular surfaces of the members are arranged so that the second surface portions come into contact and are deformed before the first surface portions come into contact.

Preferably the second radius of curvature is less than the first radius of curvature and the third radius of curvature is substantially less than both the first and second radii of curvature. For example the second radius of curvature may be about one half the first radius of curvature and the third radius of curvature may be about one tenth the second radius of curvature.

Embodiments according to the present invention will now be described, by way of example only, with reference to the accompanying drawings.

BRIEF DESCRIPTION OF THE DRAWINGS

FIGS. 6 and 7 are axial sectional views of other embodiments of the pipe connectors according to the present invention.

DETAILED DESCRIPTION OF THE PREFERRED EMBODIMENT

Figure 1:
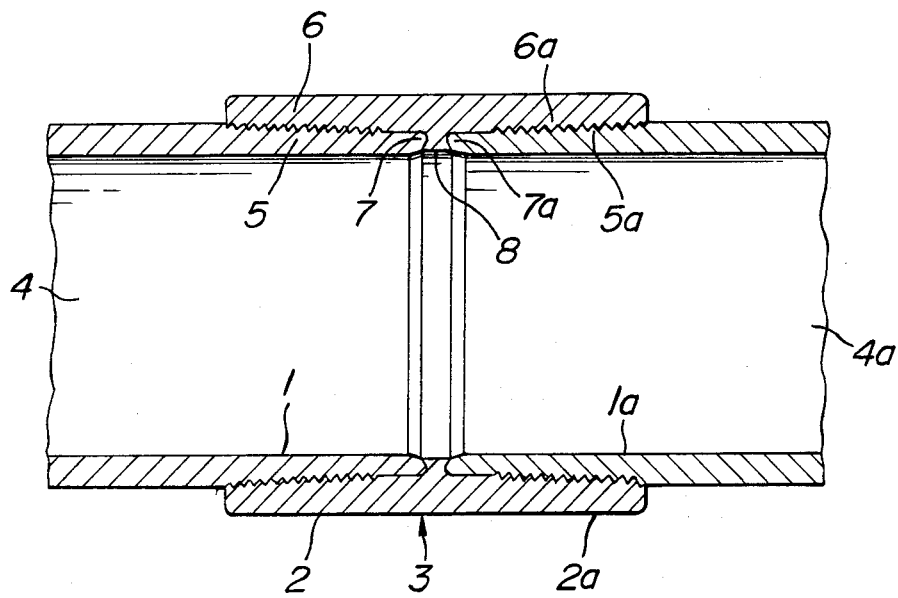
FIG. 1 is an axial sectional view through an embodiment of pipe connector according to the present invention.

FIG. 1 shows a connector which comprises a male member 1 and a female member 2. In this embodiment the female member 2 is provided by part of a sleeve 3 which also provides a second female member 2a for connection with a second male member 1a. Each of the male members 1, 1a is provided at the end of a pipe section 4, 4a and may, as shown, be formed integrally with the pipe section or may be made separately and welded or otherwise fixed thereto.

As shown, each male member 1, 1a has a generally frusto-conical outer peripheral surface 5, 5a which is provided with a thread and each female member 2, 2a has a corresponding frusto-conical inner peripheral surface 6, 6a which is also provided with a thread for receiving and engaging the corresponding male member. The members may be conventionally threaded or for example may be provided with threads as described in any of co-pending UK Applications Nos. 8421540, 8421541 and 8421615. The threads on the peripheral surfaces terminate short of the free ends 7, 7a of the male members and the corresponding inner ends of the surfaces 6, 6a of the female member and, when the members are fully engaged together, a generally axially directed surface on the free end of each male member is brought into sealing abutment with a corresponding oppositely generally axially directed surface on a shoulder 8 of the female member, as will be described more fully in relation to FIGS. 2 to 5, which show only the free end 7 of male member 1 and the corresponding portion of shoulder 8 and the adjacent internal surface of the female member 2.

Figure 2:
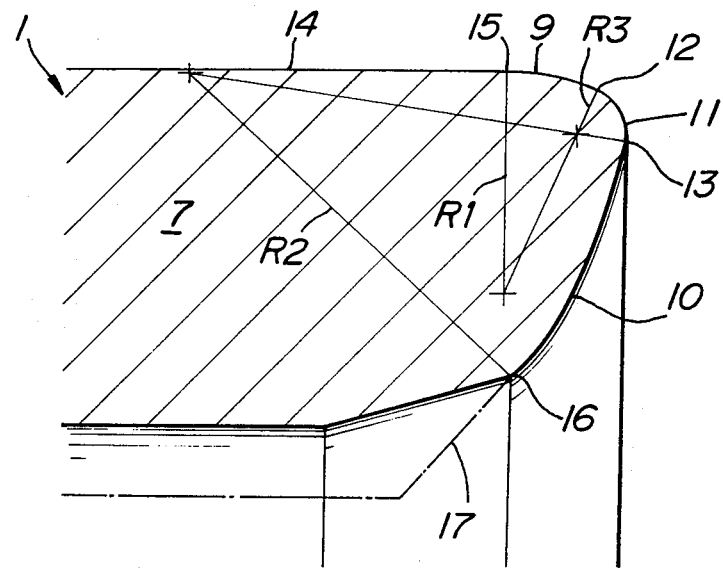
FIGS. 2 and 3 are enlarged axial sectional views of parts of the connector of FIG. 1.

As shown in FIG. 2, the free end 7 of the male member 1 is provided with a first radially outwardly and axially directed annular surface portion 9 which has a radius of curvature R1, and a second radially inwardly and axially directed annular surface portion 10 having a radius of curvature R2. The surface portions 9, 10 are interconnected by a third annular surface portion 11 having a radius of curvature R3, which surface portion 11 merges with surface portions 9 and 10 at lines 12 and 13 where the adjacent surface portions have common tangents to remove any discontinuity in the curvature of the surface portions 9, 10, 11. The third surface portion 11 extends over the apex or crest of the end surface of the male member and has a substantially smaller radius of curvature than those of the first and second surface portions. For example, the radius of curvature R1 may be about one half of the radius of curvature R2 and the radius of curvature R3 may be about one tenth of the radius of curvature R2.

The first surface portion 9 merges with a cylindrical peripheral surface portion 14 which forms a tangent to surface portion 9 at line 15. The second surface portion 10 may terminate at 16 at the inner surface of the male member. Alternatively the surface portion 10 may merge at 16 with a fourth frusto-conical surface portion 17, shown in broken lines, which forms a tangent to surface portion 10 at line 16. Surface portion 17 then terminates at the inner surface of the male member.

Figure 3:
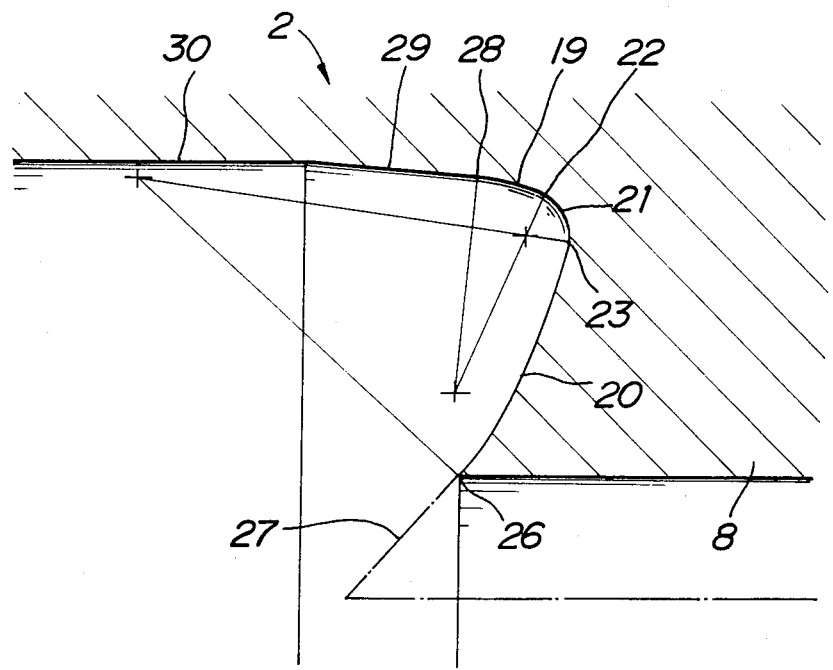
Figure 4:
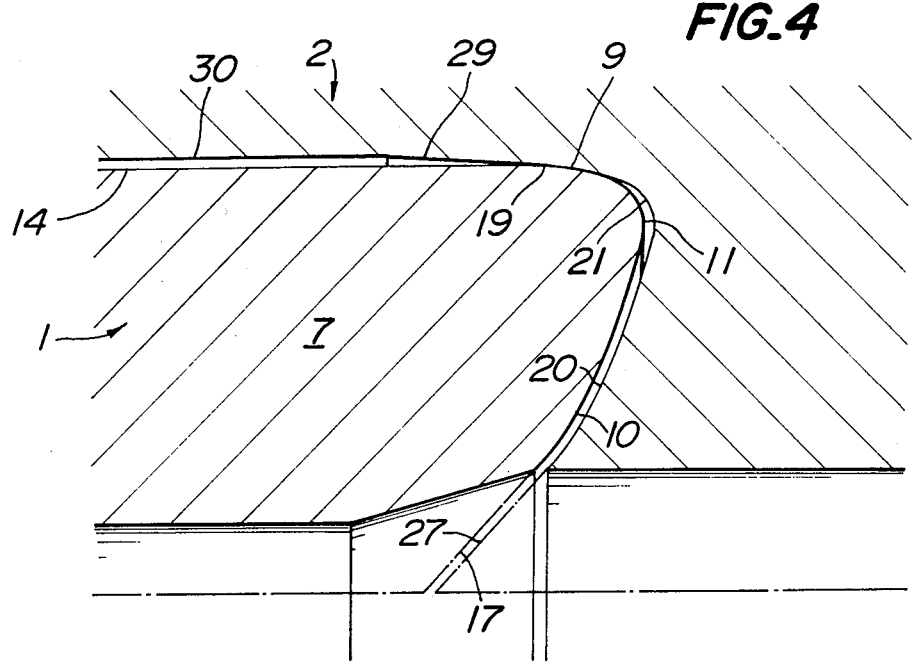
FIGS. 4 and 5 show the parts of FIGS. 2 and 3 during interengagement of the members of the pipe connector of FIG. 1.
Figure 5:
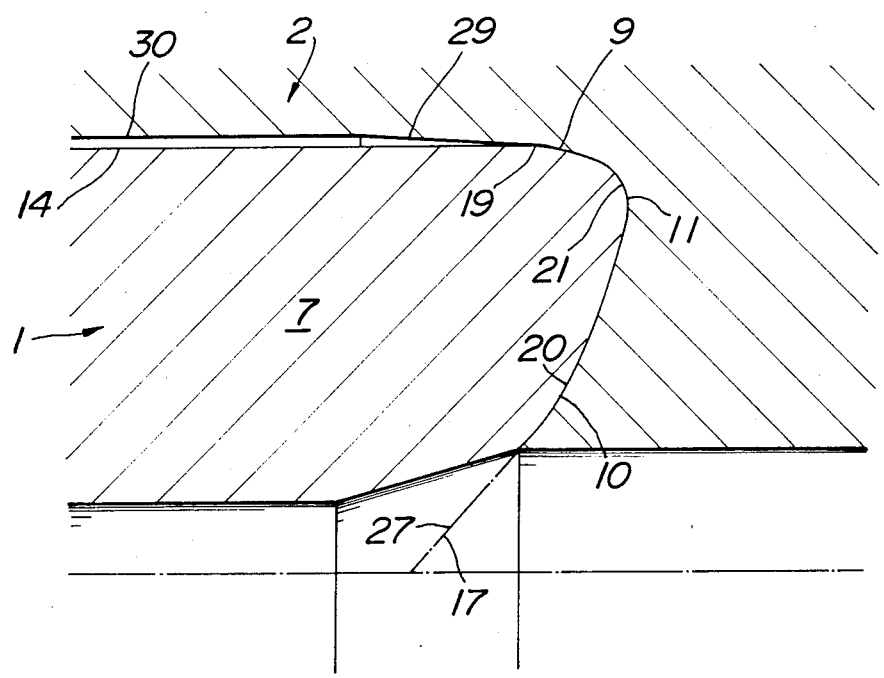

As shown in FIG. 3, the female member 2 is provided with surface portions 19, 20, 21 and optionally 27 corresponding to surface portions 9, 10, 11 and 17 of the male member and with substantially the same radii of curvature R1, R2 and R3 and with lines of merging 22, 23 and 26 corresponding to lines 12, 13 and 16. However in the female member, the first surface portion 19 merges at 28 with a frusto-conical surface portion 29, which may for example extend at between about 5° and 30° to the axis, and which is followed by a cylindrical surface portion 30. The maximum diameter of surface portion 29 is greater than the diameter of surface portion 14 of the male member so that surface portions 14 and 30 are slightly spaced even with full interengagement of the members. However the minimum diameter of surface portion 29 is less than the diameter of surface portion 14 and the maximum dimensions of portions 9, 10, 11 are greater than those of portions 19, 20, 21. Thus as the members are screwed together, the free end of the male member is guided toward its final position by the frusto-conical surface portion 29 of the female member and initially makes contact with the female member in the region of line 28. Surfaces 9 and 19 then progressively come into contact as shown in FIG. 4 with an increasing degree of deformation, which is initially elastic and finally plastic, so that these surfaces 9, 19 are subject to triaxial stresses due to both axial compression and radially inward deflection or deformation of the end portion of the free end 7 of the male member which is caused by the contact between the surfaces 9 and 19. As surfaces 9 and 19 become fully engaged, surfaces 10 and 20, and 17 and 27 if provided, come into abutment are compressed together, as shown in FIG. 5.

The surfaces 9, 10 and 11, and 19, 20 and 21 are dimensioned and arranged so that, when surfaces 9 19 and 10, 20 are fully engaged together and under the designed compressive stress, surfaces 11 and 21 may be slightly spaced apart or in contact, but they will in any even experience substantially less compressive stress than surfaces 9, 19 and 10, 20.

The tolerancing of the radii of curvature of the surfaces 9, 10 and 11 and 19, 20 and 21 in such that the radii of curvature of surfaces 19 and 20 of the female member are at least equal to or slightly greater than the radii of curvature of surfaces 9, 10, and the radius of curvature of surface 21 is at most equal to or slightly less than the radius of curvature of surface 11.

Figure 8:
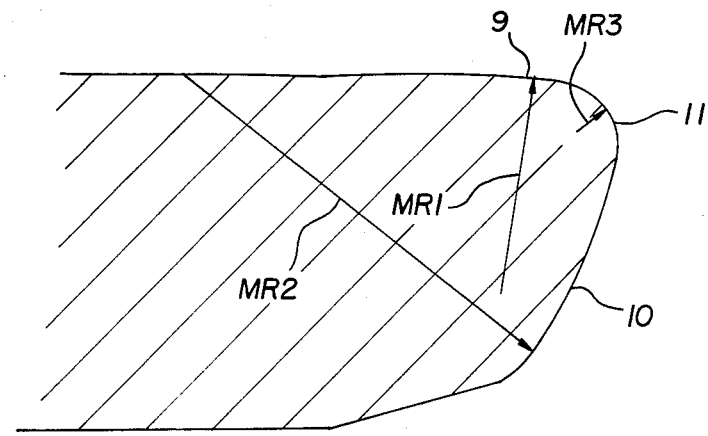
FIGS. 8 and 9 are enlarged sectional views of parts of the connector of FIG. 1, illustrating the radii of curvature of the annular surfaces of the male and female members, respectively.
Figure 9:
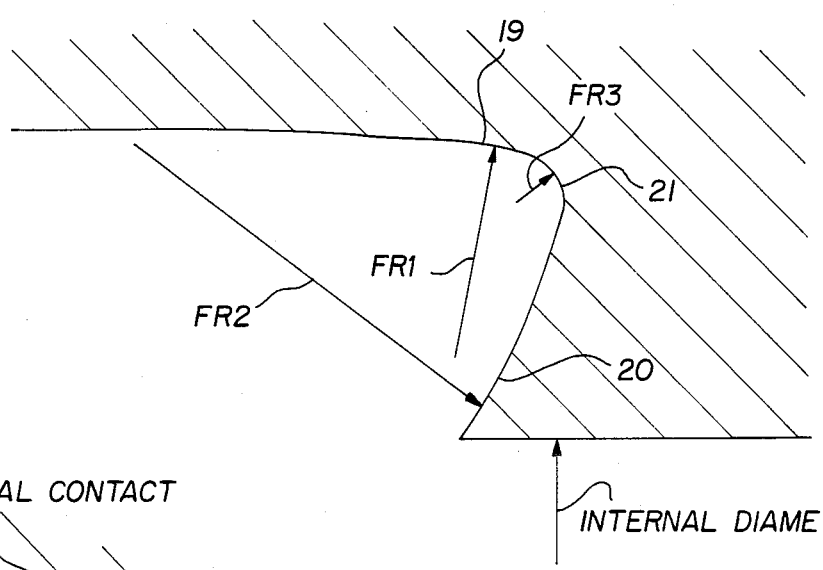

The radii of curvature of annular surfaces 9, 10, and 11 of the male member are specifically illustrated and shown in FIG. 8, as MR1, MR2, and MR3. The radii of curvature of annular surfaces 19, 20, and 21 of the female member are specifically illustrated in FIG. 9, as FR1, FR2, and FR3.

Figure 10:
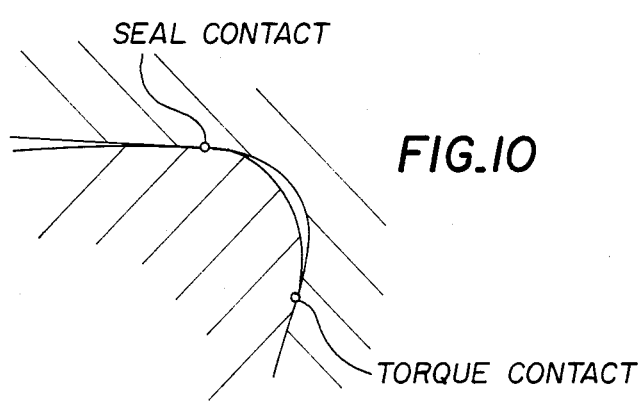
FIG. 10 shows the parts of FIGS. 8 and 9 during interengagement of the members of the pipe connector of FIG. 1, illustrating the clearance between the members on an exaggerated scale.

The clearance between the male and female members during the interengagement thereof, is illustrated on an exaggerated scale in FIG. 10. This Figure also illustrates the two line contacts, namely, a seal contact and a torque contact.

When radii of curvature FR1 and FR2 are slightly larger than the radii of curvature MR1 and MR2, and radius of curvature FR3 is slightly smaller than the radius of curvature MR3, the following relationship therebetween may be expressed:

$$FR2 > MR2 > FR1 > MR1 > MR3 > FR3 \quad (1)$$

While the invention has been described in the context of a connector in which the female member is provided by a sleeve, it will be appreciated that it is equally applicable to a pin and box connector, for example as shown in FIG. 6, where the male and female members 31, 32 are formed integrally with or fixed, for example as shown by welding, or otherwise to the ends of pipe sections 4, 4a, a generally axially directed surface, e.g. as described with reference to FIG. 2, at the free end 37 of the male member 31 making abutting sealing contact with a corresponding generally axially directed surface, e.g. as described with reference to FIG. 3, provided on shoulder 38 on the female member 32.

Additionally, while the invention has been described in terms of sealing abutment between a generally axially directed surface on the free end of the male member and an internal surface on the female member, it will be appreciated that it is equally applicable to a connector where sealing is required between a generally axially directed surface on the free end of the female member and a corresponding surface on the male member, for example as shown in FIG. 7. As shown in FIG. 7 an axially directed surface on the free end 38 of the female member 32 makes abutting sealing contact with a surface provided on a shoulder 39 of the male member 31. Surface portions corresponding to surface portions 9, 10, 11 are provided on the free end 38 and surface portions corresponding to surface portions 19, 20, 21 are provided on the shoulder 39 as described above except that the surface portions corresponding to portions 9 and 19 are radially inwardly, rather than radially outwardly, directed (and are therefore herein termed second surface portions) and the surface portions corresponding to portions 10, 20 are radially outwardly, rather than radially inwardly, directed (and are therefore herein termed first surface portions). The female member may also be provided with surface portions corresponding to portions 14 and 17 and the male member may be provided with surface portions corresponding to portions 29, 30 and 27.

In a specific embodiment of a pipe connector as described above in relation to FIGS. 1 to 5, the radii of curvature R1, R2 and R3 of the male member are 0.2 inches, 0.4 inches and 0.04 inches, and the axial distance between the centers of the circles radius R1 and R2 is 0.287 inches.

What is claimed is:

1. A pipe connector comprising a female member having an internal circumferential surface provided with a thread and a male member having an external circumferential surface corresponding to the internal circumferential surface of the female member, to be received within the female member and provided with a thread for engagement with the thread of the female member, one of said members being provided at the free end with a first generally radially directed annular surface and a second generally axially directed annular surface, and the other of said members being provided with a first annular surface and a second annular surface which make abutting sealing contact with said first and second annular surfaces of the one member, respectively, when the members are fully engaged together, wherein said members are provided with third annular surfaces, respectively, which are located between said first and second annular surfaces and smoothly connect these first and second annular surfaces, radii of curvature of the first and second annular surfaces of the other of the members being larger than radii of curvature of the first and second annular surfaces of the one of the members, diameters of the first and second annular surfaces of the other of the members being smaller than diameters of the first and second annular surfaces of the one of the members, and a radius of curvature of the third annular surface of the other of the members being smaller than a radius of curvature of the third annular surface of the one of the members, whereby a relationship between the radii of curvature of the first, second, and third annular surfaces of the one and the other of the members, respectively, is expressed as follows:

$$FR2 > MR2 > FR1 > MR1 > MR3 > FR3$$

where MR1, MR2, and MR3 are the radii of curvature of the annular surfaces of the one of the members, and FR1, FR2, and FR3 are the radii of curvature of the annular surfaces of the other of the members.

2. A pipe connector as set forth in claim 1, wherein said one of the members is the male member and the other is the female member.

3. A pipe connector as set forth in claim 1, wherein said one of the members is the female member and the other is the male member.

4. A pipe connector as set forth in claim 1, wherein in the region where the third annular surface of each of the members merges with the first and second surfaces, these annular surfaces have common tangents.

* * * * *